(12) United States Patent
Wallet-Laïly et al.

(10) Patent No.: US 11,561,034 B2
(45) Date of Patent: Jan. 24, 2023

(54) REFRIGERANT VESSEL COMPONENT AND REFRIGERATION CIRCUIT COMPRISING SUCH A REFRIGERANT VESSEL COMPONENT

(71) Applicants: Carrier Corporation, Palm Beach Gardens, FL (US); Jeremy Wallet-Laïly, Saint Cyr au mont d'or (FR)

(72) Inventors: Jeremy Wallet-Laïly, Saint Cyr au mont d'Or (FR); Charbel Rahhal, Lyons (FR); Francois Lambert, Neuville sur Saône (FR); Aurelien Jud, Lyons (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 12 days.

(21) Appl. No.: 16/973,203

(22) PCT Filed: Jul. 27, 2018

(86) PCT No.: PCT/IB2018/001007
§ 371 (c)(1),
(2) Date: Dec. 8, 2020

(87) PCT Pub. No.: WO2020/021299
PCT Pub. Date: Jan. 30, 2020

(65) Prior Publication Data
US 2021/0254870 A1    Aug. 19, 2021

(51) Int. Cl.
*F25D 19/00* (2006.01)
*F25B 39/00* (2006.01)
(Continued)

(52) U.S. Cl.
CPC ............ *F25B 39/00* (2013.01); *F04D 29/669* (2013.01); *F25B 43/02* (2013.01); *F25B 39/02* (2013.01);
(Continued)

(58) Field of Classification Search
CPC .......... F25B 39/00; F25B 43/02; F25B 39/02; F25B 39/04; F25B 2339/0242;
(Continued)

(56) References Cited

U.S. PATENT DOCUMENTS 5,704,215 A    6/1998   Lord et al.
6,868,695 B1   3/2005   Dingel et al.
(Continued)

FOREIGN PATENT DOCUMENTS

CN    101317049 A    12/2008
CN    101600918 A    12/2009
(Continued)

OTHER PUBLICATIONS

International Search Report Application No. PCT/IB2018/001007; dated Apr. 2, 2019; pp. 5.
(Continued)

*Primary Examiner* — Henry T Crenshaw
*Assistant Examiner* — Kamran Tavakoldavani
(74) *Attorney, Agent, or Firm* — Cantor Colburn LLP

(57) ABSTRACT

This refrigerant vessel component (2, 4, 7) for a refrigeration circuit (100), comprises a shell (10) extending along a longitudinal axis (X) delimiting an internal volume (V), in which circulates a refrigerant fluid (R), whereas the refrigerant vessel component (2) comprises an inner shell (20) located radially inside the shell (10) and extending on at least a portion of the circumference of the shell (10), and whereas the inner shell (20) is at least partly formed of perforated material.

13 Claims, 4 Drawing Sheets

(51) Int. Cl.
  *F04D 29/66* (2006.01)
  *F25B 43/02* (2006.01)
  *F25B 39/02* (2006.01)
  *F25B 39/04* (2006.01)

(52) U.S. Cl.
  CPC ....... *F25B 39/04* (2013.01); *F25B 2339/0242* (2013.01); *F25B 2339/046* (2013.01); *F25B 2500/12* (2013.01); *F25B 2500/13* (2013.01)

(58) Field of Classification Search
  CPC ............ F25B 2339/046; F25B 2500/12; F25B 2500/13; F04D 29/669
  See application file for complete search history.

(56) References Cited

U.S. PATENT DOCUMENTS

| | | | |
|---|---|---|---|
| 6,932,190 B2 | 8/2005 | Sishtla | |
| 8,827,033 B2 | 9/2014 | Schnitta | |
| 9,316,281 B2 | 4/2016 | Koefele | |
| 10,612,823 B2* | 4/2020 | Moreaux | F28F 9/0131 |
| 11,162,735 B2* | 11/2021 | Christians | F25B 39/028 |
| 2004/0005225 A1 | 1/2004 | Marshall et al. | |
| 2008/0163637 A1 | 7/2008 | Ring et al. | |
| 2016/0040942 A1 | 2/2016 | Dziubinschi et al. | |
| 2016/0169229 A1 | 6/2016 | Kimura et al. | |
| 2016/0320136 A1 | 11/2016 | Christians et al. | |

FOREIGN PATENT DOCUMENTS

| | | |
|---|---|---|
| CN | 101749892 A | 6/2010 |
| CN | 202955842 U | 5/2013 |
| CN | 107062952 A | 8/2017 |

OTHER PUBLICATIONS

Written Opinion Application No. PCT/IB2018/001007; dated Apr. 2, 2019; pp. 5.
Common Knowledge Evidence: "Building Materials", Alan Everett, Chongqing University Press, 1st Edition, Oct. 2008, pp. 10-11.
Office Action for Chinese Application No. 201880095008.7 dated Jul. 5, 2022.

* cited by examiner

REFRIGERANT VESSEL COMPONENT AND REFRIGERATION CIRCUIT COMPRISING SUCH A REFRIGERANT VESSEL COMPONENT

CROSS-REFERENCE TO RELATED APPLICATIONS

This application is a National Phase of PCT Application No. PCT/IB2018/001007 filed Jul. 27, 2018 the disclosure of which is incorporated herein by reference in its entirety.

The present invention concerns a refrigerant vessel component for a refrigeration circuit, and a refrigeration circuit comprising such a refrigerant vessel component.

In the chiller and heating systems industry, the sound and noise level of the equipment is now a major characteristic. The refrigeration circuits comprise rotating compressors which generate sound pulsations which radiate in the whole circuit.

Refrigerant vessel components, such as heat exchangers or oil separators, are often a source of noise, due to the fact that they comprise a shell of generally metallic material in which circulates the refrigerant. As a direct sound source, the component will emit noise by radiating the pulsations from the compressor; while as an indirect source, the component can transmit and amplify pulsations to others components. Although multiple systems such as mufflers or absorbers can reduce pulsation levels, the integration of such components is often costly and design troubling.

Other issues are the transfer paths of pulsations, and possible amplification in refrigerant vessel components. In order to properly reduce pulsations and limit transfer paths, efficient reduction dispositive shall be placed both at the input and output of components.

In order to properly reduce radiation (sound emission from refrigerant vessel), acoustic treatment is often added as an external layer of the shell.

Several integrated technologies exist in order to reduce such vibrations and pulsations: helix baffles, parallel baffles, oblique baffle plates but these are complicated to implement.

The aim of the invention is to provide a new refrigerant vessel component in which the sound pulsations are better absorbed and with the help of less complicated and more efficient devices.

To this end, the invention concerns a refrigerant vessel component for a refrigeration circuit, comprising a shell extending along a longitudinal axis delimiting an internal volume, in which circulates a refrigerant fluid, whereas the refrigerant vessel component comprises an inner shell located radially inside the shell and extending on at least a portion of the circumference of the shell, and whereas the inner shell is at least partly formed of perforated material.

Thanks to the invention, the sound pulsations are reduced inside the refrigerant vessel component. Both the radiating noise coming from the component and the sound pulsations of the whole refrigeration circuit are reduced. The double shell can, for example, replace pulsation reducers on pipe lines. This solution appears to be more cost efficient, easy to implement and provides great benefits to the sound behavior of the refrigeration circuit.

According to further aspects of the invention, which are advantageous but not compulsory, such a refrigerant vessel component may incorporate one or several of the following features:

The inner perforated shell is located in a vapor area of the refrigerant vessel component, in which the refrigerant fluid is in vapor phase.

An acoustic treatment layer is provided radially between the shell and the inner perforated shell.

The acoustic treatment layer comprises at least one of:
porous materials,
cavities.

The refrigerant vessel component comprises radial plates linking the shell and the inner shell and which form the cavities between them.

At least one of the cavities is filled with a block of porous material formed by absorbent foam.

The absorbent foam has an absorbance coefficient superior to 0.3.

At least one of the cavities is filled with a block of porous material comprising melamine, glass fiber or another fibrous material.

At least one of the cavities is left empty and built as a resonator with a hole of the perforated inner shell making communication between the cavity and the internal volume of the refrigerant vessel component.

The inner shell extends on at least 75% of the total length of the refrigerant vessel component.

The inner shell has a shape homothetic to the shape of the shell.

The perforated material of the inner shell comprises holes having a largest dimension comprised between 0.1 and 20 millimeters.

The refrigerant vessel is a heat exchanger, such as an evaporator or a condenser, or an oil separator.

The invention also concerns a refrigeration circuit comprising at least one refrigerant vessel component as mentioned above.

The invention will be explained with regard to the annexed figures, as an illustrative example. In the annexed figures.

Figure 1:
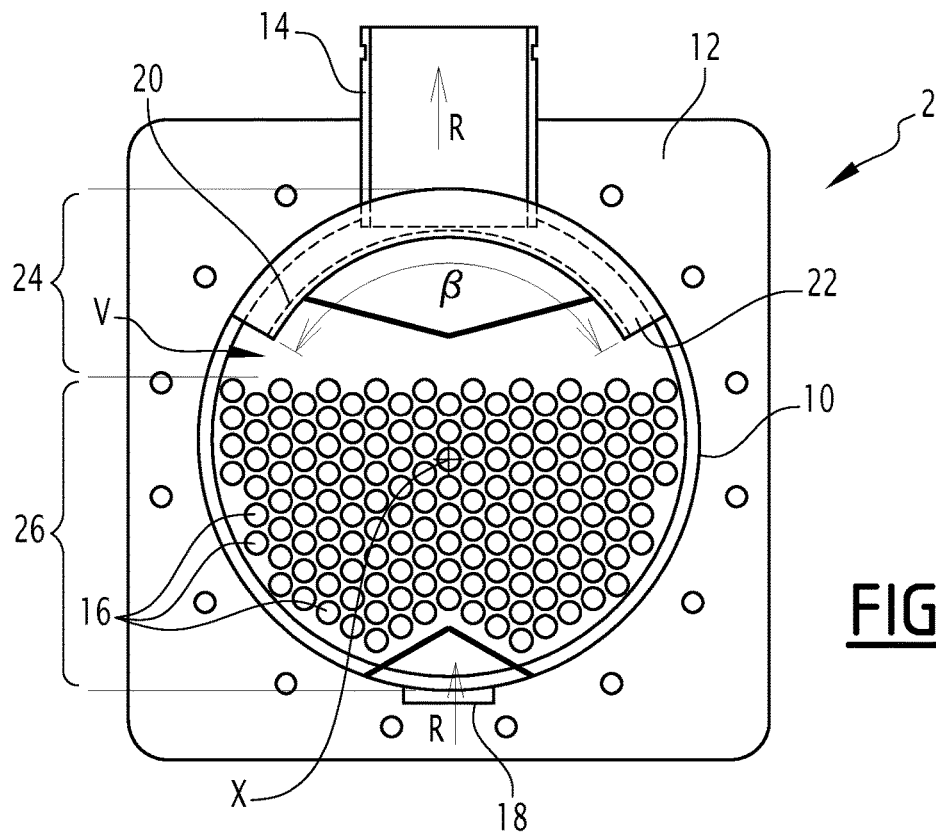
FIG. 1 is a sectional view of a flooded evaporator embodying the invention.
Figure 9:
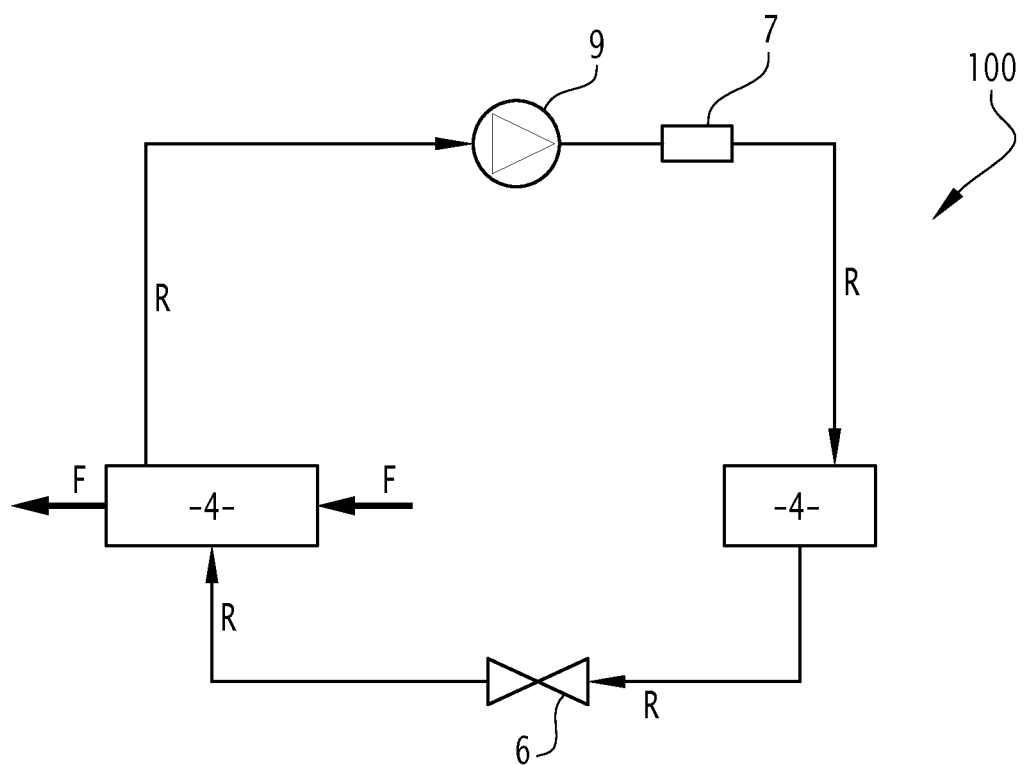
FIG. 9 is a schematic view of a refrigeration circuit according to the invention.

FIG. 1 shows an evaporator 2 belonging to a refrigeration circuit 100 as depicted in FIG. 9. The refrigeration circuit 100 comprises an evaporator 2, a compressor 9, a condenser 4 and a pressure reducer 6. A fluid F to be cooled down circulates in the evaporator 2. A refrigerant fluid R circulates in the refrigeration circuit 100. The working principle of a refrigeration circuit is well-know and will not be further detailed.

As shown in FIG. 1, the evaporator 2 forms a refrigerant vessel component. The evaporator 2 comprises a shell 10 which extends along a longitudinal axis X. The shell 10 has a substantially cylindrical shape centered on the longitudinal axis X. The shell 10 comprises end plates, of one is shown in FIG. 1 with the reference number 12, and which extends perpendicularly to the longitudinal axis X. The shell 10 and the end plates 12 delimit an internal volume V of the evaporator 2.

The terms "axial", "radial" and "longitudinal" are used in reference to the longitudinal axis X.

The evaporator 2 is of the flooded type. The evaporator 2 includes a bundle of pipes 16 for circulation of the fluid F which is to be cooled down. The bundle of pipes 16 extends along the longitudinal axis X through the end plates 12 inside the internal volume V.

The evaporator 2 comprises an inlet pipe 18 allowing entry of the liquid refrigerant R into the internal volume V of the evaporator.

The evaporator 2 also comprises at least one suction pipe 14 allowing the vaporized refrigerant fluid R to be sucked out of the internal volume V towards the compressor 9.

The compressor 9 is a rotating machine which generates sound pulsations. To prevent the shell 10 of the evaporator 2 from amplifying, radiating or transmitting the sound pulsations, the evaporator 2 comprises an inner shell 20 located radially inside the evaporator shell 10, and extending on a portion of the circumference of the shell 10. An acoustic treatment layer 22 is provided radially between the shell 10 and the inner shell 20, forming a sandwich structure. The acoustic treatment layer 22 is designed to reduce the sound pulsation of the refrigerant R. The implementation of acoustic treatment inside the shell 10 allows reducing the issue of sound emission of the shell 10 before it appears, as the risk of the shell 10 vibrating is substantially reduced by reducing pulsation. To the contrary, state-of-the-art acoustic treatment devices integrated on the external side of the shell deal with the sound issue after it appears, as they do no avoid internal shell pulsation.

The acoustic treatment layer 22 and the inner shell 20 may cover a portion of the inner circumference of the shell 10, taken around the central axis X, defined as an apex angle β comprised between 90° and 180°, for example.

The inner shell 20 has preferably a shape homothetic to the shape of the shell 10. In the present example, the inner shell 20 has a cylindrical shape homothetic to the cylindrical shape of the shell 10. Both the inner shell 20 and the shell 10 are centered on the central axis X.

Figure 4:
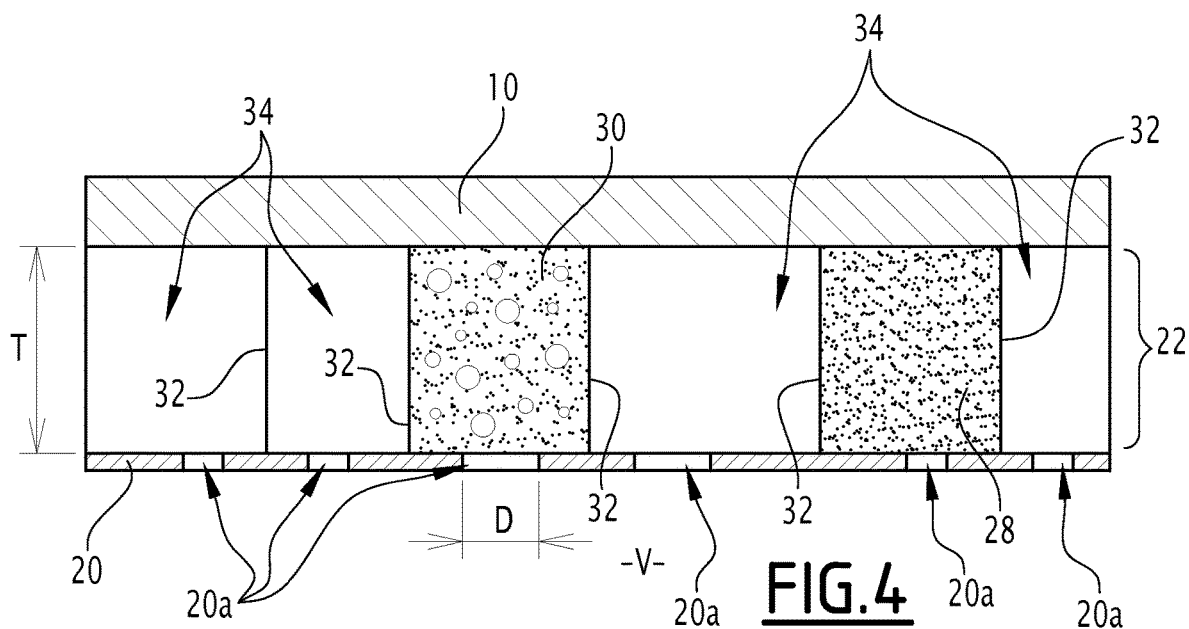
FIG. 4 is sectional view of a double shell of a refrigerant vessel component according to the invention.
Figure 5:
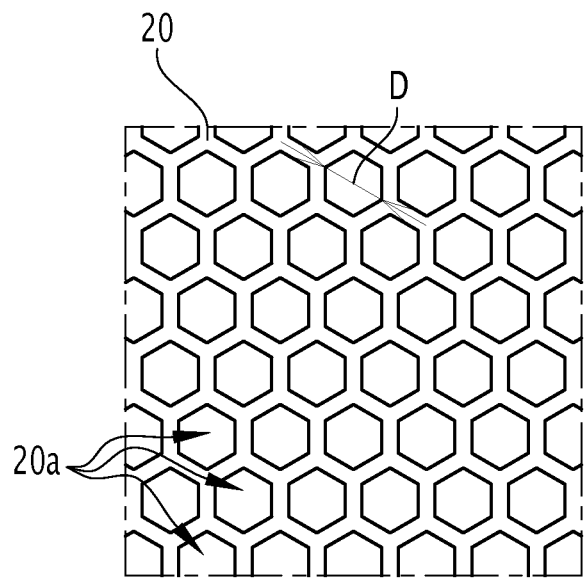
FIGS. 5 to 8 are views of perforated materials used to manufacture a perforated inner shell of a refrigerant vessel component according to the invention.
Figure 6:
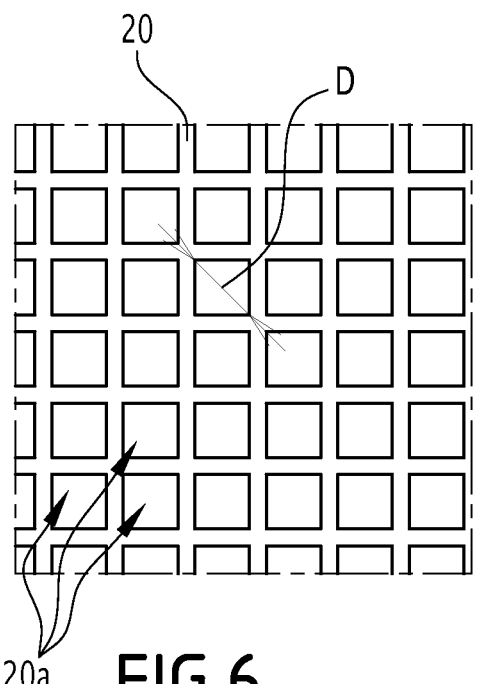
Figure 7:
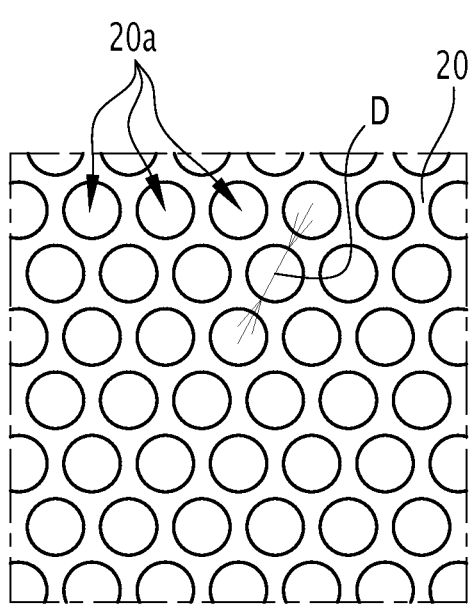

The acoustic treatment layer 22 and the inner shell 20 are represented in larger scale and in detail in FIG. 4. As can be seen in FIG. 4, the acoustic treatment layer 22 is schematically shown as having a straight shape, but may be curved in reality. The inner shell 20 is at least partly formed of perforated material. The inner shell 20 comprises a plurality of holes 20a, which form a passage between the acoustic treatment layer 22 and the internal volume V.

Figure 8:
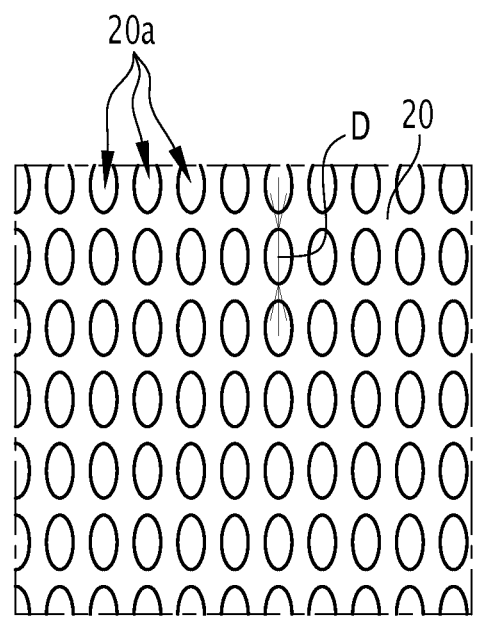

The inner shell 20 may be made as a perforated plate of any material. For example, the inner shell 20 may be of perforated metal sheet, such as shown in FIGS. 5 to 8. The holes 20a of the perforated plate may have any shape, including a hexagonal shape (FIG. 5) or more generally a polygonal shape, square or rectangular shape (FIG. 6), round shape (FIG. 7) or an ovoid shape (FIG. 8). The distribution of holes 20a may be random or regular, with various densities.

Alternatively, the inner shell 20 may be made of metallic stainless steel wire mesh.

The holes 20a of the perforated material of the inner shell 20 may have a largest dimension D comprised between 0.1 and 20 millimeters. For example, the largest dimension D may be the diameter for a round shape, the largest diameter for an oval shape, the distance between two most remote vertexes for a polygonal shape, etc. The dimensions of the holes 20a may be the same for every hole 20a or be different.

The acoustic treatment layer 22 is located in a vapor area 24 of the evaporator 2, in which the refrigerant R is in vapor or gaseous phase. As shown in FIG. 1, the acoustic treatment layer 22 extends in the upper part of the internal volume V, which forms the vapor area 24, but is not present in the lower part of the internal volume V, which forms a vapor-liquid area 26, in which the refrigerant R is present in both liquid and gaseous/vapor phase.

The acoustic treatment layer 22 may comprise at least one of the following components:
porous materials,
cavities.

Inside the structure sandwich, the porous material may be either a block 28 of absorbent foam, either a block 30 of porous material chosen between, for example, melamine, glass fiber or any other fibrous material. In the case of cavities, nothing is placed between the shell 10 and the perforated inner shell 20. The absorbent foam may have a sufficient absorbance coefficient α to treat pulsation in the frequency range of interest. For example, the absorbance coefficient may be superior to 0.3.

The acoustic treatment layer 22 comprises radial plates 32 linking the shell 10 and the inner shell 20 and forming cavities 34 between them.

At least one of the cavities 34 is filled with porous material such as absorbent foam, and at least one of the cavities 34 is filled with porous material such as fibrous materials. Some cavities 34 may be left empty. The acoustic treatment layer 22 may comprise any number of cavities 34 filled with absorbent foam, fibrous material or may be left empty. The holes 20a provide a communication between the cavities 34 and the internal volume V in order for the cavities 34 to act as a resonator.

The cavities 34 may have different volumes. The ratio between the volume of the cavities 34 and the dimensions of the holes 20a may be chosen to obtain the most efficient sound reduction and absorption. Some cavities 34 may be designed as Helmholtz resonators.

A thickness T of the acoustic treatment layer 22, taken radially between the shell 10 and the inner shell 20 shall be correctly design to fulfill acoustics requirement, such as frequency range of interest, efficiency, sufficient absorption and definition of the cavities volume.

Figure 2:
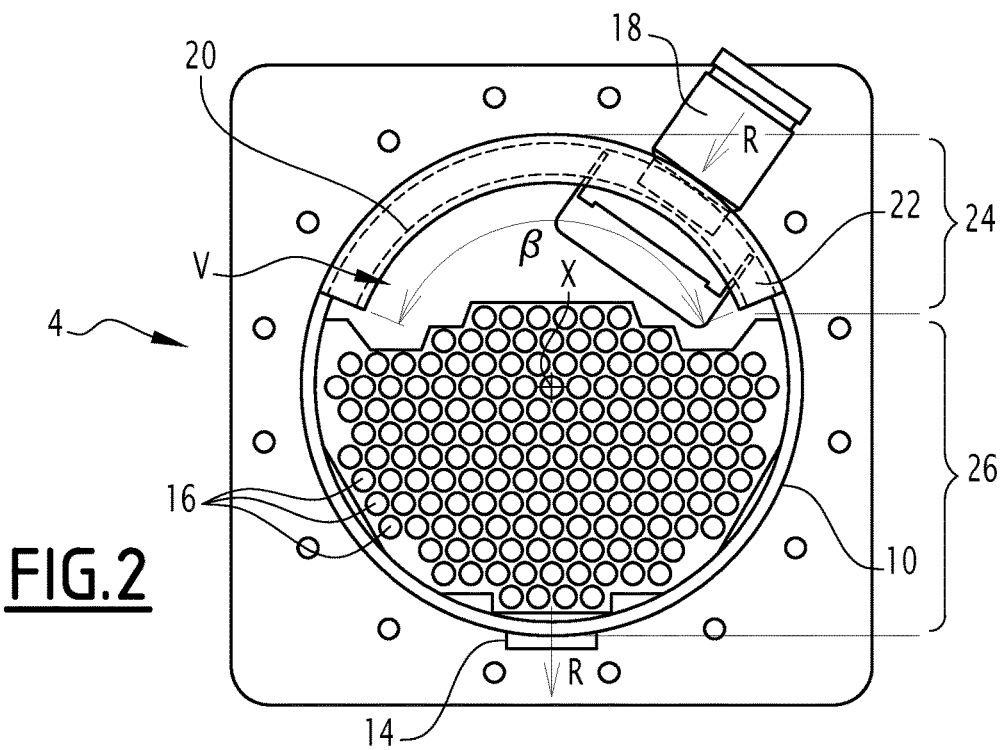
FIG. 2 is a sectional view of a condenser embodying the invention.

The invention has been described with regard to the evaporator 2. The invention, however, also similarly applies to other types of refrigerant vessel components, such as other heat exchangers like the condenser 4 shown in FIG. 2. On the condenser 4, elements similar to the elements of the evaporator 2 bear the same references and work in the same way. The condenser 4 also comprises a shell 10 centered on a central axis X, a bundle of pipes 16, in which passes a fluid colder than the refrigerant R which circulates in the shell 10. In the condenser 4, the refrigerant fluid R enters into an inlet pipe 18 located on the upper area of the shell 10, and exits via an outlet pipe 14 located on the bottom side of the shell 10.

The condenser 4 has a similar vapor phase area 24, in which are located the acoustic treatment layer 22 and the inner shell 20, and a vapor-liquid phase area 26, in which the acoustic treatment layer 22 and the inner shell 20 are not present.

Figure 3:
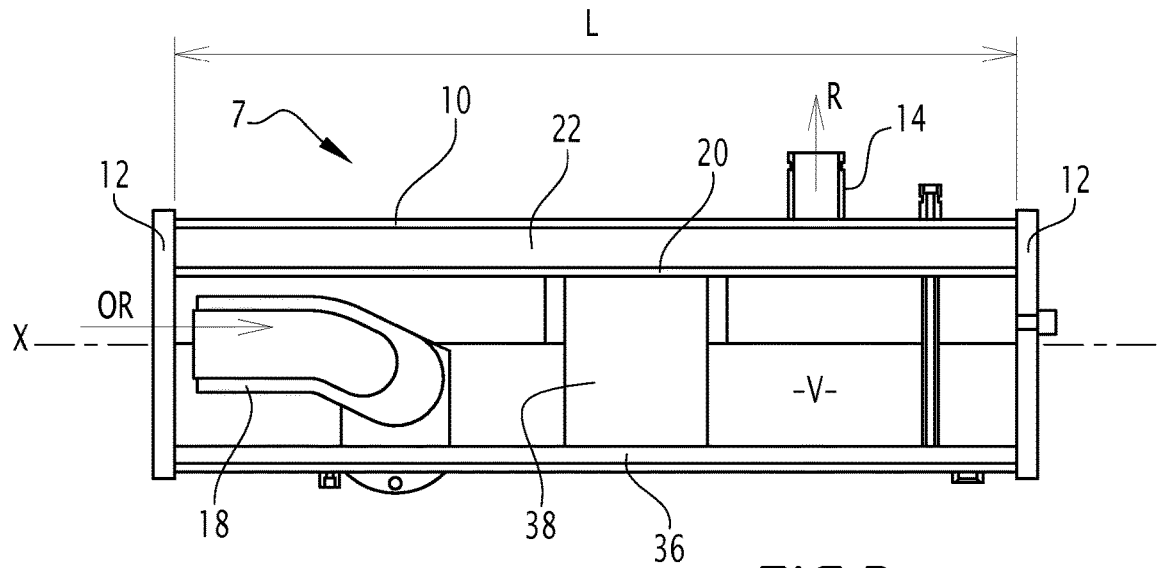
FIG. 3 is a side view of an oil separator embodying the invention.

The refrigeration circuit 100 may also comprise at least one oil separator 7 shown in FIG. 3, for separation of lubrication oil from the compressor 9 mixed with the refrigerant R and return of the lubrication oil to the compressor 9. The refrigeration circuit 100 may comprise other oil separators 7.

The oil separator 7 also forms a refrigerant vessel component to which the invention applies. The oil separator 7 comprises a shell 10 extending around the central axis X, an inner shell 20, and end plates 12 perpendicular to the central axis X. Oil in liquid state 36 drips and accumulates in the bottom side of the shell 10. A flow OR of lubrication oil mixed with refrigerant comes in via an inlet pipe 18, and the separated refrigerant R comes out in vapor phase via an outlet pipe 14. The oil separator 7 comprises various oil separating components, such as an oil mesh 38. Separated oil is returned to the compressor 9 thanks to non-shown oil return devices.

The acoustic treatment layer 22 is provided between the shell 10 and the inner shell 20 on the upper side of the oil separator 7, where refrigerant R is in vapor phase, and is not present in the lower side, where lubrication oil and refrigerant are in both vapor and liquid phase.

For each of the three exemplary types of refrigerant vessel components described above, the inner shell 20 and the acoustic treatment layer 22 may extend for example on at least 75% of the total length L of the refrigerant vessel component. As shown in FIG. 3, the inner shell 20 and the acoustic treatment layer 22 may extend along the whole length L of the refrigerant vessel component.

According to a non-shown embodiment, the evaporator 2, the condenser 4 or the oil separator 7 may comprise only a perforated inner shell 20 with no acoustic treatment layer 24 placed between the inner shell 20 and the shell 10. In such a case, the perforated inner shell 20 may define an annular-shaped portion of space with respect to the shell 10. Depending on the respective shapes of the shell 10 and the perforated inner shell 20, such a space may have other shapes. The inner shell 20 may be fixed to the shell 10 with any convenient technique.

The compressor 9 used in the refrigeration circuit 100 may be either a centrifugal compressor or a screw compressor.

The features of the embodiments and variants described above may be combined to form new embodiments of the invention.

The invention claimed is:

1. A refrigerant vessel component for a refrigeration circuit, comprising a shell extending along a longitudinal axis delimiting an internal volume, in which circulates a refrigerant fluid, wherein the refrigerant vessel component comprises an inner shell located radially inside the shell and extending on at least a portion of the circumference of the shell, and wherein the inner shell is at least partly formed of perforated material;
wherein an acoustic treatment layer is provided radially between the shell and the inner perforated shell.

2. The refrigerant vessel component according to claim 1, wherein the inner perforated shell is located in a vapor area of the refrigerant vessel component, in which the refrigerant fluid is in vapor phase.

3. The refrigerant vessel component according to claim 1, wherein the acoustic treatment layer comprises at least one of:
porous materials,
cavities.

4. The refrigerant vessel component according to claim 3, wherein the refrigerant vessel component comprises radial plates linking the shell and the inner shell and which form the cavities between them.

5. The refrigerant vessel component according to claim 4, wherein at least one of the cavities is filled with a block of porous material formed by an absorbent foam.

6. The refrigerant vessel component according to claim 5, wherein the absorbent foam has an absorbance coefficient superior to 0,3.

7. The refrigerant vessel component according to claim 3, wherein at least one of the cavities is filled with a block of porous material comprising melamine, glass fiber or another fibrous material.

8. The refrigerant vessel component according to claim 3, wherein at least one of the cavities is left empty and built as a resonator with a hole of the perforated inner shell making communication between the cavity and the internal volume of the refrigerant vessel component.

9. The refrigerant vessel component according to claim 1, wherein the inner shell extends on at least 75% of the total length of the refrigerant vessel component.

10. The refrigerant vessel component according to claim 1, wherein the inner shell has a shape homothetic to the shape of the shell.

11. The refrigerant vessel component according to claim 1, wherein the perforated material of the inner shell comprises holes having a largest dimension comprised between 0,1 and 20 millimeters.

12. The refrigerant vessel component according to claim 1, wherein the refrigerant vessel component is a heat exchanger, such as an evaporator or a condenser, or an oil separator.

13. A refrigeration circuit comprising at least one refrigerant vessel component, the refrigerant vessel component including:
a shell extending along a longitudinal axis delimiting an internal volume, in which circulates a refrigerant fluid, wherein the refrigerant vessel component comprises an inner shell located radially inside the shell and extending on at least a portion of the circumference of the shell, and wherein the inner shell is at least partly formed of perforated material;
wherein an acoustic treatment layer is provided radially between the shell and the inner perforated shell.

* * * * *